United States Patent [19]
Betz

[11] Patent Number: 5,992,440
[45] Date of Patent: Nov. 30, 1999

[54] WASHER SAVER FAUCET VALVE

[76] Inventor: John J. Betz, 2 W. Conrad Dr., Wilmington, Del. 19804

[21] Appl. No.: 09/134,085

[22] Filed: Aug. 14, 1998

[51] Int. Cl.⁶ .................................................. F16K 31/50
[52] U.S. Cl. ............................... 137/15; 74/25; 137/315; 251/215; 251/218; 251/229; 251/264; 251/274
[58] Field of Search .................................... 251/274, 264, 251/88, 215, 214, 218, 229; 137/15, 315; 74/25

[56] References Cited

U.S. PATENT DOCUMENTS

| | | | |
|---|---|---|---|
| 32,797 | 7/1861 | Stebbins | 251/264 |
| 68,733 | 9/1867 | Grant | 137/244 |
| 92,748 | 7/1869 | Ramsden et al. | 251/221 |
| 115,794 | 6/1871 | Walsh | 251/264 |
| 955,272 | 4/1910 | Kilbourn | 251/218 |
| 1,662,659 | 3/1928 | Birnstock | 137/625.35 |
| 1,958,988 | 5/1934 | Eisele | 251/274 |
| 2,191,128 | 2/1940 | Jolly et al. | 251/274 |
| 2,238,387 | 4/1941 | Friedel | 251/274 |
| 2,271,391 | 1/1942 | Drake | 251/46 |
| 2,403,028 | 7/1946 | Smith | 251/160 |
| 2,583,291 | 1/1952 | Beem | 251/215 |
| 3,007,671 | 11/1961 | Bartlett | 251/88 |
| 3,049,332 | 8/1962 | Webster | 251/88 |
| 3,117,762 | 1/1964 | Bartlett | 251/88 |
| 3,222,027 | 12/1965 | Gilleeny | 251/88 |
| 3,286,736 | 11/1966 | Guillermic | 137/628 |
| 3,322,145 | 5/1967 | Prosser | 137/517 |
| 3,679,169 | 7/1972 | Bedo et al. | 251/88 |
| 3,761,052 | 9/1973 | Tobbe et al. | 251/88 |
| 3,892,383 | 7/1975 | Hesse | 251/88 |
| 4,106,747 | 8/1978 | Malacheski et al. | 251/84 |
| 4,114,851 | 9/1978 | Shivak et al. | 251/88 |
| 4,167,195 | 9/1979 | Miller | 251/88 |

Primary Examiner—George L. Walton
Attorney, Agent, or Firm—Elman & Associates

[57] ABSTRACT

The present invention provides a novel faucet with a non-circular slider assembly to which a resilient seat-washer is attached. In a preferable embodiment of the invention the slider assembly has a hexagonal cross-section. In embodiments of the invention the slider assembly is driven by a rotatory stem operated with a handle. The rotatory stem is provided with a helical groove mating with a faucet body of a complementary shape so that upon rotation of the stem the slider assembly is advanced towards or withdrawn from a sealing seat. Thus, when the handle of the stem is rotated by a user, the stem and the hexagonal slider assembly associated with it, are moved by the interacting force generated between the pair of helical threads, towards or away from the seat depending on the rotation direction.

7 Claims, 6 Drawing Sheets

Fig_1

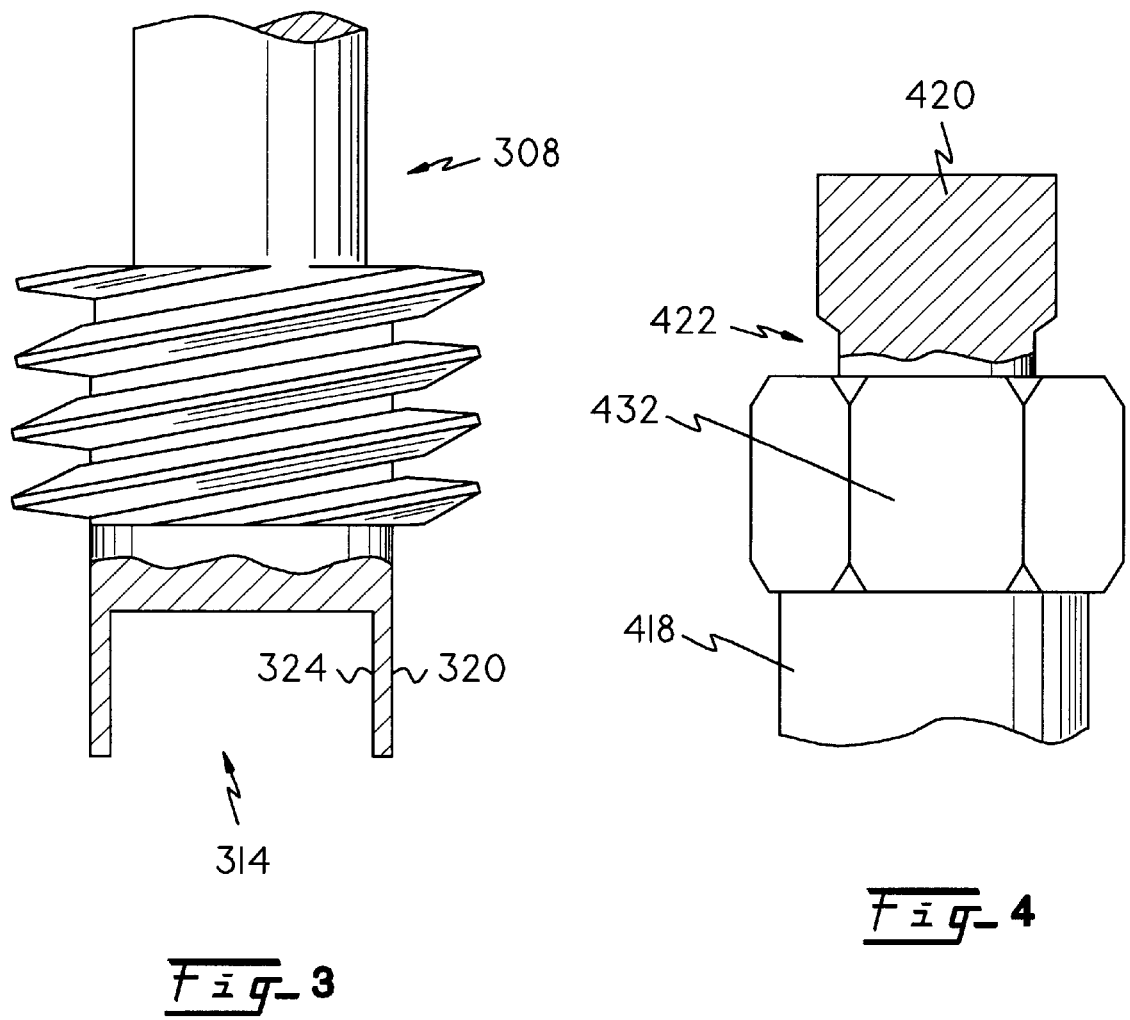

WASHER SAVER FAUCET VALVE

FIELD OF THE INVENTION

The present invention is in the general field of valves, more specifically faucet valves. The present invention concerns such valves that control the flow of fluids by the action of a rotatory stem that drives a seat-washer against a seat.

BACKGROUND OF THE INVENTION

The rapid wear of the seat-washer found in valves and faucets is caused by the rotation of the seat-washer against a seat. Rotation of the seat-washer in many water faucet designs occurs as the seat-washer is driven against a valve seat by a rotating stem.

U.S. Pat. No. 2,403,028 to Smith teaches a means to prevent further rotation of a resilient washer after it has been rotationally mated with a valve seat. Smith discloses a faucet in which a handle is rotated so that a stem brings pressure between a seal and a valve seat so that liquid flow is cut off. As the handle is rotated further in the Smith faucet, the stem travels a small additional distance downward and encounters a metal stop, preventing further travel. This feature prevents excessive compression and destructive rotation of the resilient material of the washer. Smith does not, however, teach any means to prevent rotation of the resilient washer as it mates with the valve seat.

U.S. Pat. No. 4,106,747 to Malacheski teaches a special washer construction means intended to prevent any rotational engagement between a resilient washer and a valve seat. However, the special washer must itself be replaced and has teeth that could break off and interfere with the operation of the faucet.

U.S. Pat. 2,271,391 to Drake discloses an assembly in which a washer is restricted from rotating with respect to the valve seat. Drake teaches a stem-borne lug that intermeshes with a channel between two vertical lugs formed in the valve shell.

Thus, it is apparent that the wearing of faucet seat-washers by their action against faucet seats is an existing problem that leads to the annoyance of users, water loss, and the necessity of frequent repairs to existing faucets.

SUMMARY OF THE INVENTION

A principal objective of the present invention is to significantly reduce wear of the resilient seat-washer of a valve. The present invention achieves a reduction in wear by preventing the seat-washer from rotating against the seat as the valve is closed. The decreased wear of the seat-washer increases its service life thereby allowing the valve, or faucet, to operate much longer before the seat-washer fails and the valve leaks until the seat-washer is replaced. Accordingly, faucets incorporating the present invention require less maintenance than conventional faucets and tend to conserve water due to decreased leakage by failed seat-washers.

The present invention provides a non-circular slider assembly with an attached resilient seat-washer, which slides within a broached cavity of a complementary shape. Embodiments of the invention are envisaged which have a square, hexagonal or octagonal slider assembly. In a preferable embodiment of the invention the slider assembly has a hexagonal cross-section. It will be appreciated by those of skill in the art, that the slider assembly and the complementary cavity may be of any non-circular shape to achieve the purposes of the present invention. In embodiments of the invention the slider assembly is moved longitudinally by a rotatory valve stem. In some embodiments of the present invention, the valve stem drives the slider assembly and pressure of the fluid serves to lift the slider assembly from the seat when the valve stem is withdrawn. In other embodiments of the present invention the slider assembly is connected to the valve stem in a manner that allows free rotation of one relative to the other so that withdrawal of the valve stem lifts the slider assembly from the seat. The rotatory stem is provided with a helical ridge mating with a faucet body having a complementary helical groove so that, as the stem is rotated, the stem is advanced towards or withdrawn from a sealing seat. The non-circular cavity that receives the slider is broached in the faucet body concentrically with the helical groove.

In a particular embodiment of the present invention, the stem has a helical ridge extending outwardly around its surface and a hexagonal slider is rotatably connected to the stem. The helical ridge is adapted to mate with a complementary helical groove on the inside wall of a faucet body. When the handle of the stem is rotated by a user, the stem, and the hexagonal slider assembly driven by it, are moved towards or away from a seat, depending on the rotation direction, clockwise or counterclockwise, by the interacting force generated between the pair of helical threads. Preferably, embodiments of the present invention have renewable seats.

The hexagonal slider assembly and the stem have two principal embodiments. In both of these embodiments, the slider assembly is attached to the stem in a manner permitting relative rotation at their interface. For example, in a permanently assembled embodiment of the invention, a tubular extension of the internal end of the stem is loosely swaged into a groove about a circular extension of the hexagonal slider. In a demountable embodiment of the invention, a collar is loosely attached to the hexagonal slider by a screw, and the collar has an internal thread by which it is attached to the end of the stem which is threaded to be complementary thereto.

In another embodiment of the present invention, the slider assembly is not attached to the stem but is merely propelled by it. In this embodiment of the invention, stem rotation drives the slider assembly against the seat to cut off or adjust the rate of fluid flow. When the stem is withdrawn by rotating its handle, the freely moving slider assembly is forced away from the seat by the fluid pressure.

The present invention further encompasses a method of making a washer-saving valves such as those described herein. Such a method comprises producing a valve body having an inner surface by processes known to those of skill in the art. Such a valve body has an inlet and an outlet and a seat which is preferably replaceable, at the inlet. A helical groove is machined into the inner surface of the valve body, and a non-circular bore is broached concentrically with the helical groove also into the inner surface of the valve body.

A valve stem is machined to have a helical ridge on the outer surface thereof complementary to the helical groove in the valve body, and to have a seat-facing end.

A slider assembly is machined to have a first and second end so that at least a portion of the slider assembly has a cross-section complementary to the shape of the broached non-circular bore and which sidably fits therein. The first end of the slider assembly is made so that it can rotatably interact with the seat-facing end of valve stem and the second end of the slider assembly is made so that a seat-washer may be removably attached thereto.

An embodiment of the present invention is assembled by rotatably connecting the first end of the slider assembly to the seat facing end of a valve stem, attaching a seat-washer to the second end of slider assembly and inserting the assembled stem into the valve body by rotating the helical ridge of the valve stem in the helical groove of the valve body.

In use, when the valve stem of an embodiment of the present invention is advanced by rotation through the valve body, the valve stem advances the seat-washer against the seat as the non-circular slider slides within the broached non-circular bore. Since the slider assembly is prevented from rotating by the non-circular bore the seat-washer borne upon the slider assembly does not rotate against the seat upon contact therewith.

Accordingly, the present invention overcomes the rapid wear of the seat-washer found in conventional faucets caused by the rotatory grinding action of the seat-washer against the seat as the valve is tightened to turn the water off. By eliminating the rotation of the seat-washer when the user rotates the handle connected to the stem the present invention eliminates the wear generated between the valve seat and the seat-washer when the faucet handle is rotated to open or close the valve and also substantially eliminates friction between the washer and the seat. As a consequence, embodiments of the present invention are very easy to open and close and have a substantially extended service life when compared with conventional faucets. The ease of use is advantageous when used by those with infimities such as arthritis, and the extended service life is of particular importance in commercial establishments such as restaurants, hotels and hospitals.

BRIEF DESCRIPTION OF THE DRAWINGS

FIG. 3 is a partially sectioned view of the stem shown in FIG. 2, before it is swaged to the slider assembly shown in FIG. 4.

FIG. 4 is a partially sectioned view of a portion of a slider assembly of the present invention adapted to mate with the stem of FIG. 3.

DETAILED DESCRIPTION OF THE INVENTION

Figure 1:
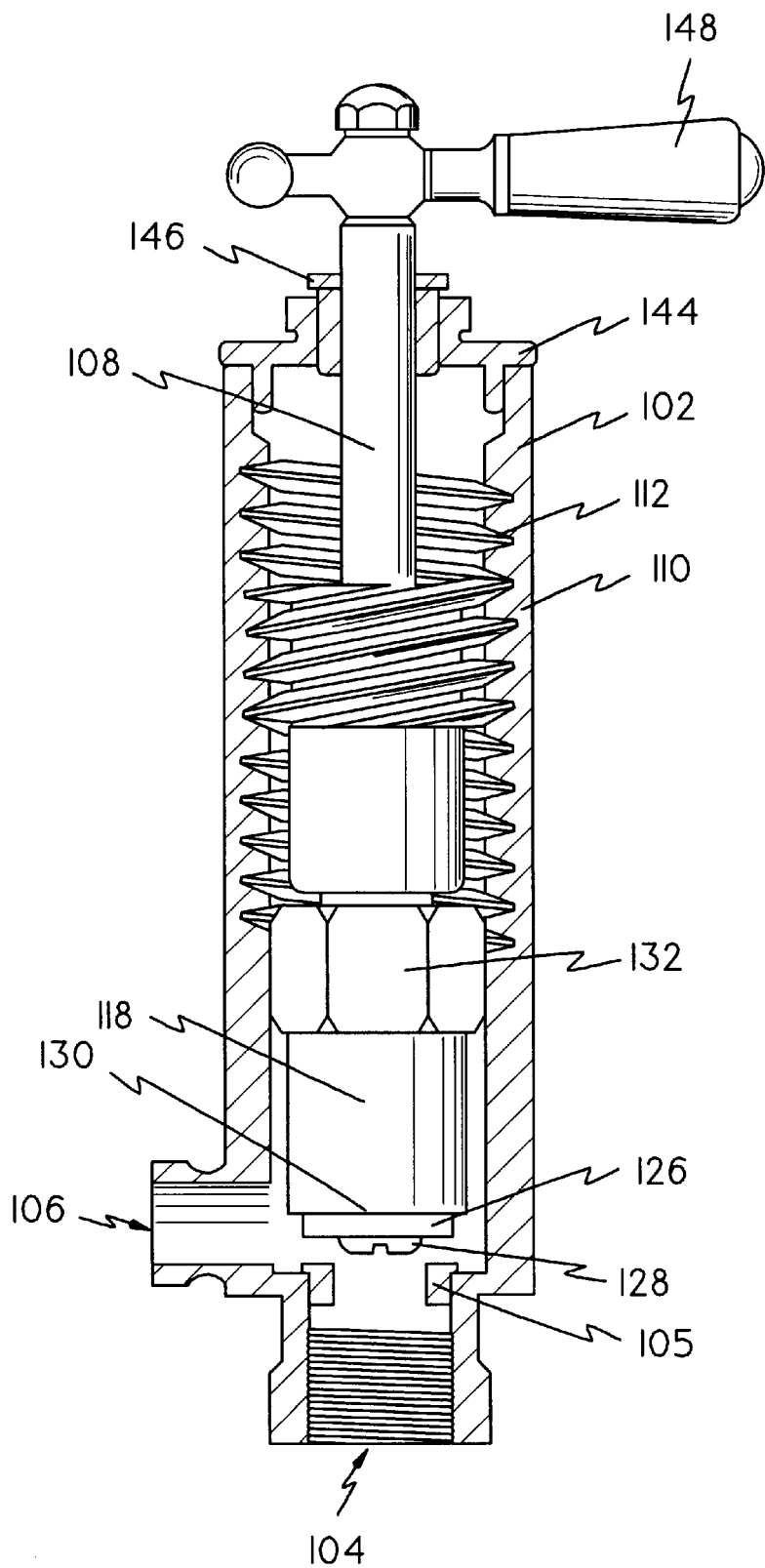
FIG. 1 is partially sectioned view showing the elements of a complete faucet of the present invention.

Referring now more particularly to the drawings and specifically to FIG. 1 thereof, one embodiment of a faucet-type valve of the present invention is there shown as a partial cross-sectional view. FIG. 1 shows a hollow housing 102, and a depending inlet 104 with a seat 105. The hollow housing is provided with an outstanding outlet 106 and both the inlet 104 and the outlet 106 communicate with the interior of the hollow housing 102. The interior of the hollow housing opens upwardly through an internally threaded opening for threadedly receiving the bonnet 144. A gland nut 146 closes the upper opening of the housing 102 in a substantially conventional manner. The bonnet 144 and the gland nut 146 are provided with a through passageway, through which extends the stem 108. It will be appreciated that bonnets of different designs may be used with faucets of the present invention so as to conform with or enhance the decor of a room in which the faucet is used.

On its outer end the stem 108 is provided with a handle 148 which may be decorative or utilitarian depending on the location of the finished fitting. Within the faucet the stem 108 is provided with external helical threads 110 in mating engagement with internal helical threads 112 of the hollow housing 102. Thus, the stem is mounted for rotative movement within the housing, and longitudinal displacement upon said rotative movement.

Associated with the stem 108 is a slider assembly 118 having a cross-section of a regular hexagon 132 that slides within a hexagonal cavity that is broached into the hollow housing 102 concentrically with the helical threads 112. The seat-adjacent end 130 of the slider assembly 118 has a seat-washer 126 attached thereto by a screw 128.

Figure 2:
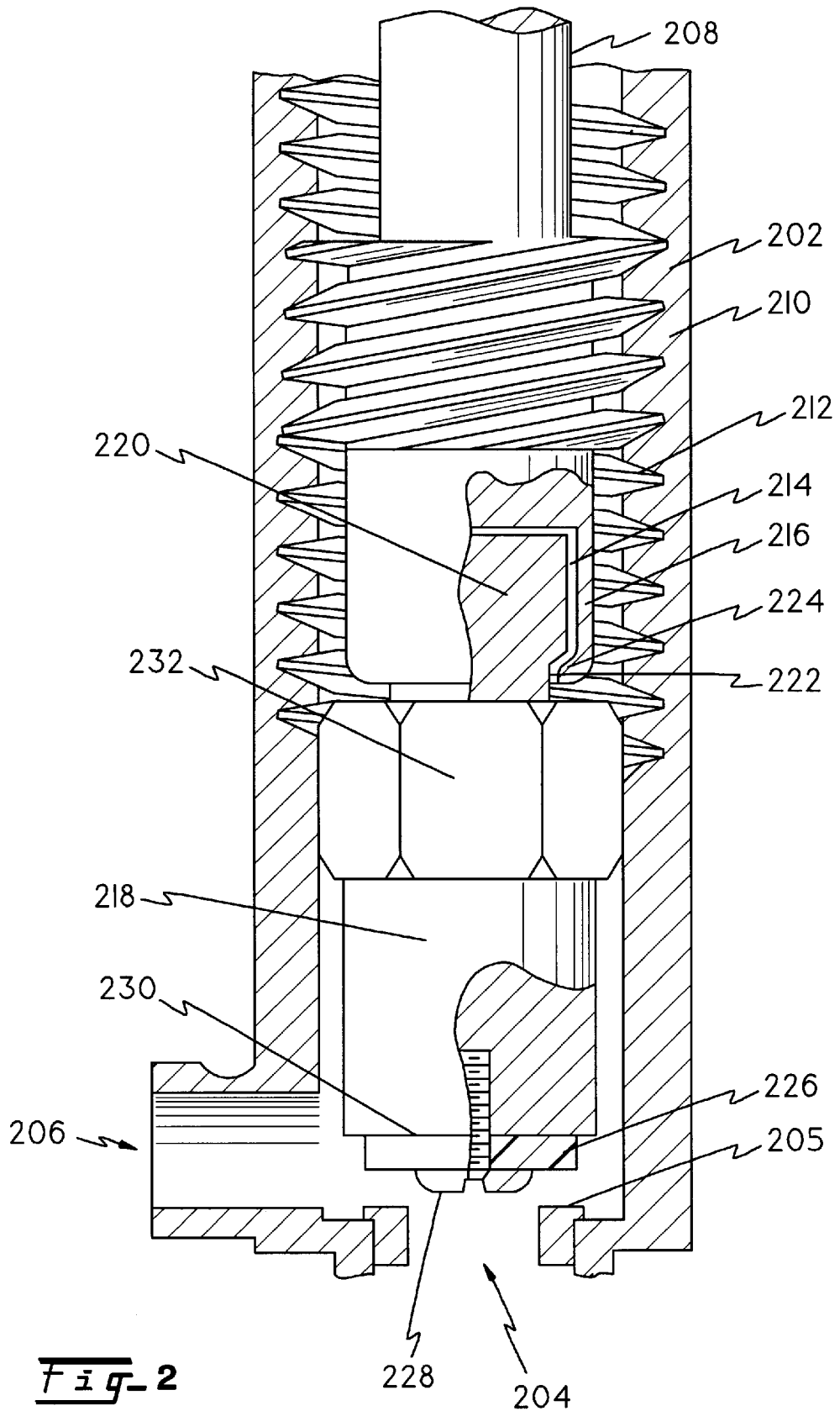
FIG. 2 is a sectional view showing the elements of a preferred embodiment of the present invention.

FIG. 2 shows an embodiment of a faucet-type valve of the present invention having a hollow housing 202, a depending inlet 204 and a seat 205. The hollow housing is provided with an outstanding outlet 206 both the inlet 204 and outlet 206 communicating with the interior of the hollow housing 202. The interior of the hollow housing opens upwardly through an internally or externally threaded opening (not shown) for threadedly receiving a bonnet or plug (not shown) so closing the upper opening of the housing in a substantially conventional manner. The bonnet or plug is provided with a through passageway, through which extends the stem 208.

On its outer end the stem may be provided with a handle. Within the faucet the stem 208 is provided with external helical threads 210 in mating engagement with internal threads 212 of the hollow housing 202. Thus, the stem is mounted for rotative movement within the housing, and longitudinal displacement upon said rotative movement. For clarity of illustration, the valves illustrated herein restrict fluid flow upon clockwise rotative movement of the stem within the housing, however it will be appreciated that embodiments of the present invention having a stem with an external helical ridge and a corresponding mating internal helical groove that restrict fluid flow upon counterclockwise rotative movement of the stem within the housing are intended to be encompassed by the disclosure of the present invention.

The stem is in general axial alignment with the inlet, and the inner end of the stem is provided with a generally circular cavity or recess 214. The inner wall of the cavity is bounded by a generally circular peripheral rim 216.

Associated with the stem 208 is a slider assembly 218. A generally cylindrical extension 220 of the stem-proximal end of the slider assembly 218 with a basal groove 222 therearound is positioned within the generally circular cavity 214 of the stem 208 and is retained within the cavity by the lip of the peripheral rim 224 that is swaged into the basal groove 222.

A cross-section of the main body of the slider assembly 218 shown in FIG. 2, has the form of a regular hexagon 232, and the slider assembly 218 slides within a hexagonal cavity that is broached into the hollow housing 202 concentrically with the helical threads 212. It will be appreciated by those of skill in the art, that the slider assembly and the complementary cavity may be of any non-circular shape to achieve the purposes of the present invention.

The seat-adjacent end 230 of the slider assembly 218 has a seat-washer 226 attached thereto by a screw 228.

Generally, the depending inlet and the outstanding outlet of the valve of the present invention may be provided with internal or external threading to allow for the attachment of standard plumbing fittings thereto. The seat-washer of the faucet of the present invention is generally a conventional seat-washer made of rubber, composition, fiber or other conventional material. The attachment screw is shown as a right hand screw in FIG. 2. However such a screw may have a left-hand or right-hand thread. The seat of a valve of the present invention may be permanently affixed or may be replaceable. If replaceable, the seat may be screwed into position or located by other means known to those of skill in the art.

The components of this embodiment of the faucet of the present invention illustrated in FIG. 2 may be further appreciated by consideration of FIGS. 3 and 4. FIG. 3 shows a portion of a stem 308 in partial cross-section before assembly onto a slider assembly. FIG. 3 shows a cross-section of the peripheral rim 320 of the generally circular cavity 314 of the stem 308 and the lip 324 of the peripheral rim that is swaged inwards upon assembly of the stem with a slider assembly.

FIG. 4 shows a portion of a slider assembly 418 in partial cross-section before assembly with a stem. FIG. 4 shows a cross-section of the generally cylindrical extension 420 of the slider assembly 418 and the basal groove 422 adjacent to the hexagonal portion 432 of the slider assembly 418.

Figure 5:
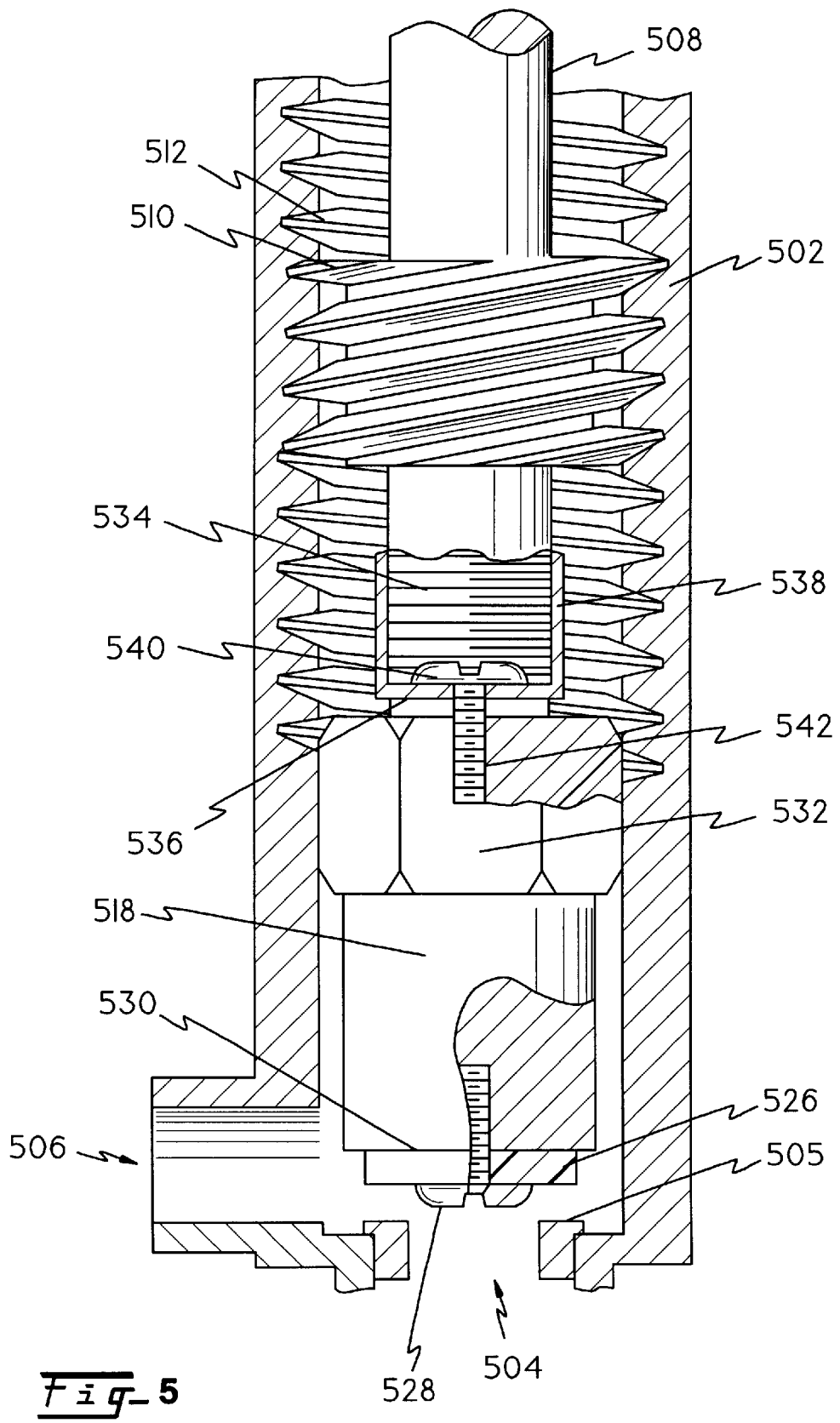
FIG. 5 is sectional view showing the elements of another embodiment of the present invention.

Referring to FIG. 5, a second embodiment of a faucet-type valve of the present invention is there shown having a hollow housing 502, a depending inlet 504 and a seat 505. The hollow housing is provided with an outstanding outlet 506 both the inlet 504 and outlet 506 communicating with the interior of the hollow housing 502. The interior of the hollow housing opens upwardly through an internally threaded opening (not shown) for threadedly receiving a bonnet or plug (not shown) so closing the upper opening of the housing in a substantially conventional manner. The bonnet or plug is provided with a through passageway, through which extends the stem or stem 508.

On its outer end the stem may be provided with a handle. Within the faucet the stem 508 is provided with external helical threads 510 in mating engagement with internal helical threads 512 of the hollow housing 502. Thus, the stem is mounted for rotative movement within the housing, and longitudinal displacement upon said rotative movement.

The stem is generally in axial alignment with the outlet, and the inner end of the stem is provided with a threaded extension 534.

Associated with the stem 508 is a slider assembly 518. The slider assembly 518 has rotatably attached at its stem-proximal end 536 a threaded cup 538 that is threadedly engaged with the threaded extension 534 of the stem 508. The threaded cup 538 is rotatably attached to slider assembly 518 by a screw 540 engaged in a threaded recess 542 in the slider assembly 518.

A cross-section of the main body of the slider assembly 518 has the form of a regular hexagon 532, and the slider assembly 518 slides within a hexagonal cavity that is broached into the hollow housing 502 concentrically with the helical threads 512.

The seat-adjacent end 530 of the slider assembly 518 has a seat-washer 526 attached thereto by a screw 528.

Figure 7:
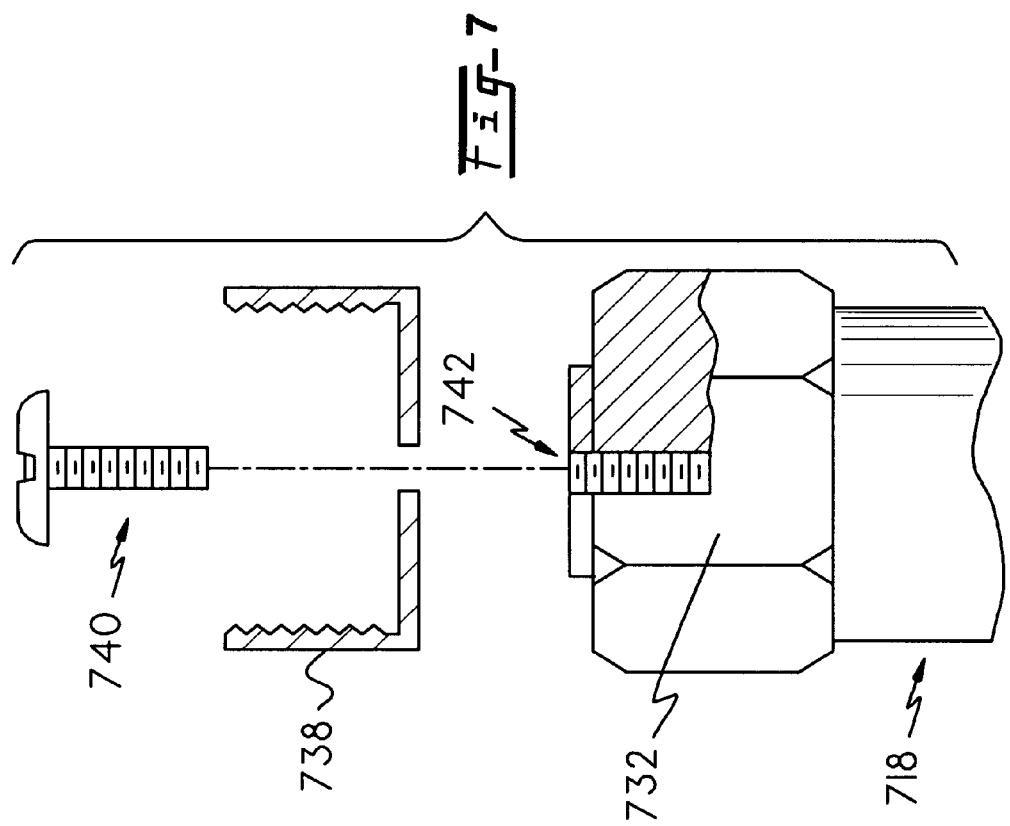
FIG. 7 is an "exploded" view showing the elements of a portion of a slider assembly of the present invention as embodied in FIG. 5.
Figure 6:
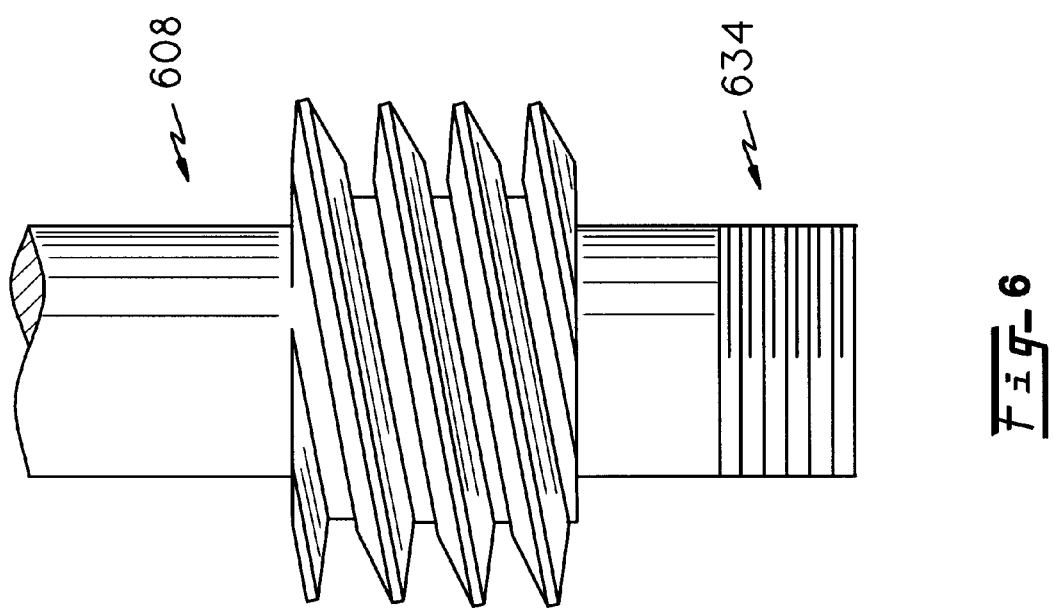
FIG. 6 is a view of the stem shown in FIG. 5.

The components of this second embodiment of the faucet of the present invention illustrated in FIG. 5 may be further appreciated by consideration of FIGS. 6 and 7. FIG. 6 shows a portion of a stem 608 in partial cross-section before assembly onto a slider assembly. FIG. 6 shows the threaded extension 634 of the stem 608 that is threadedly engaged with the threaded cup of the slider assembly upon assembly.

FIG. 7 shows in partial cross-section an exploded portion of a disassembled slider assembly 718 before assembly with a stem. FIG. 7 shows a cross-section of the threaded cup 738 together with the screw 740 that holds the threaded cup 738 to the hexagonal portion 732 of the slider assembly 718. Also shown is the threaded bore 742 with which screw 740 engages to hold threaded cup 738 in rotatory attachment to slider assembly 718.

Figure 8:
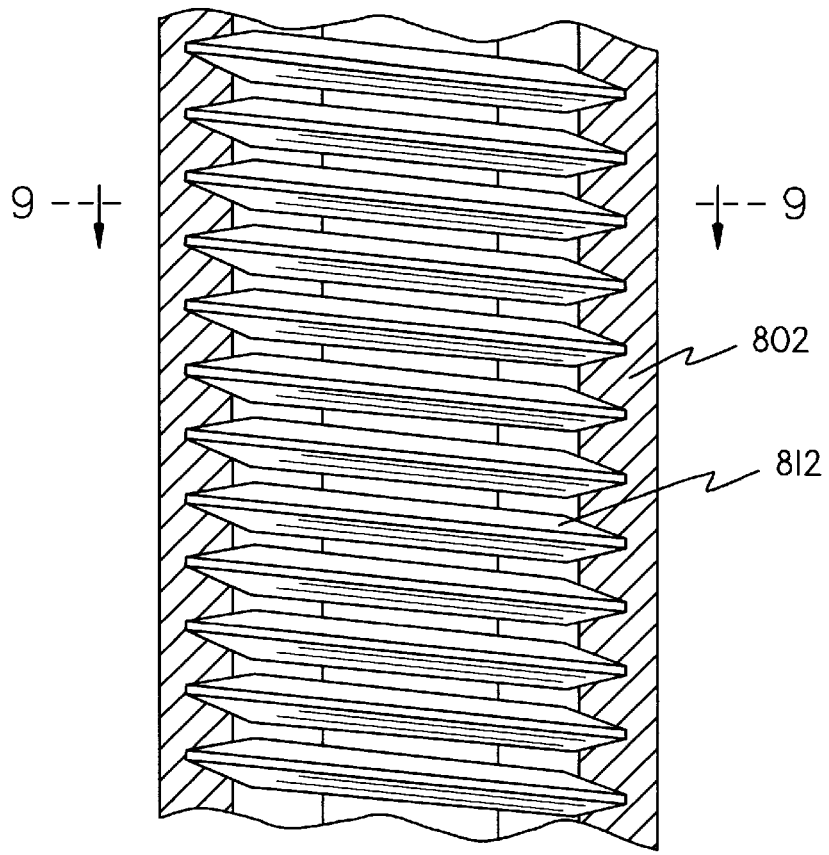
FIG. 8 is a longitudinal cross-section of a hollow housing of the present invention having a hexagonal broach.
Figure 9:
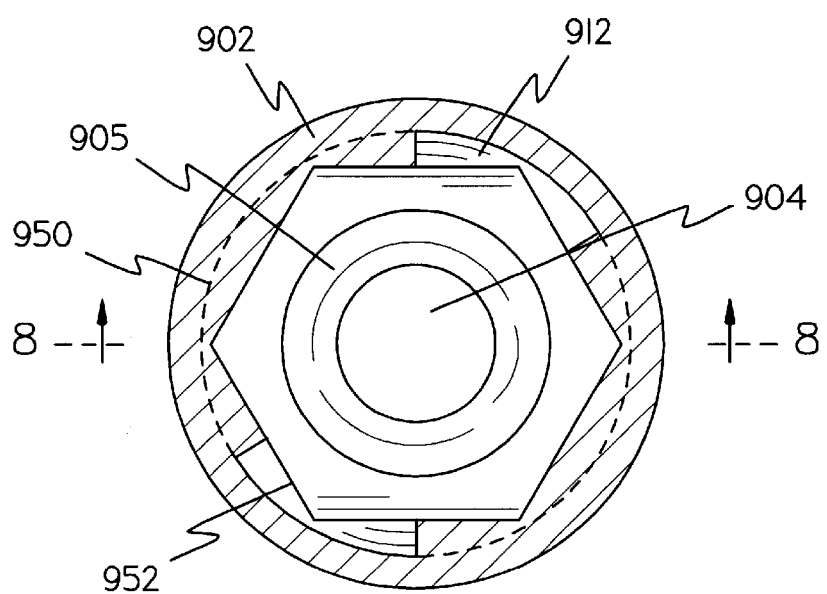
FIG. 9 is a transverse cross-section of the hollow housing shown in FIG. 8.

FIGS. 8 and 9 illustrate the detailed structure of a preferred form of a hollow housing of the present invention as has been described with respect o the embodiments shown in FIGS. 1 through 7. FIG. 8 shows a longitudinal cross-section of a portion of a hollow housing 802 showing the internal circular helical threads 812. Section line 9—9 shows the location of the transverse cross-section shown in FIG. 9.

FIG. 9 shows a transverse cross-section of a hollow housing 902 as it would be seen viewed from the handle end of a hollow housing. FIG. 9 shows a portion of the internal circular helical threads 912 shown cut-through and the location of hidden portions thereof shown as a dashed line 950. The hexagonal axially-located cavity that is broached into the hollow housing 902 concentrically with the helical threads 912 is shown. The seat 905 surrounding inlet 904 is viewed through the hexagonal broached cavity. Section line 8—8 shows the direction of view of the longitudinal cross-section shown in FIG. 8.

It will be appreciated that any non-circular shape may be used for the slider and complementary cavity. When assembled, the non-circular broached cavity receives the complementary non-circular slider assembly and prevents it from rotating relative to the seat upon rotation of the stem.

In operation, a partially open condition being shown in FIGS. 1, 4 and 7, it will there be apparent that the stem is axially rotatable in the hollow housing to shift the seat-washer-bearing slider assembly longitudinally toward and away from the valve seat. In the open condition shown, further closing rotation of the stem would shift the seat-washer closer toward the valve seat. As rotation of the slider assembly is restrained by interfitting engagement of its hexagonal body with the broached hexagonal bore of the faucet body, relative rotation may only occur between the stem and the slider assembly. This relative rotation and wear occasioned thereby is spread over substantial areas of lose-fitting relatively hard materials, so that only negligible wear occurs. Thus, the seat-washer of a faucet of the present invention is moved substantially non-rotatably into bearing-engagement with the seat, and is compressed thereagainst by force transmitted from the stem through the slider assembly.

It will be appreciated that the seat-washer fit on the seat is not critical, and a single size of seat-washer may be employed with a range of different sizes of stems. Thus, in the relatively less frequent event of replacing seat-washers, which is simply accomplished by merely attaching a new seat-washer to the slider assembly, it is not necessary that as great a number of different seat-washers be inventoried.

From the foregoing, it is apparent that the present invention provides a valve construction which substantially eliminates rotative frictional engagement between the seat-washer and valve seat to greatly increase seat-washer life and ease faucet operation, and otherwise fully accomplishes its intended objects. For purpose of clarity of understanding, embodiments that use a hexagonal slider are illustrated herein. However, it is to be understood that sliders of any non-circular shape are within the spirit of the invention and although the present invention has been described in some detail by way of illustration for purposes of clarity of understanding, it is to be understood that changes and modifications may be made within the spirit of the invention.

I claim:

1. A washer-saving valve comprising:
   a valve body having an inner surface and a seat;
   said valve body having concentrically on the inner surface thereof:
      a helical thread, and
      a non-circular bore broached through said helical thread;
   a helical-threaded valve stem complementary to said helical thread having a seat-facing end, and
   a slider assembly at least a portion of which has a cross-section complementary to said broached non-circular bore;
   wherein:
      said slider assembly has a seat-washer thereon and fits slidably but non-rotatably within said non-circular bore and is in a driven relationship to said seat-facing end of said helical-threaded valve stem;
   whereby:
      when the valve stem is advanced by rotation through the valve body, the slider assembly is prevented from rotating by the non-circular bore so that the seat-washer borne upon the slider assembly does not rotate against the seat upon contact therewith.

2. The washer-saving valve of claim 1, wherein:
   said broached non-circular bore and said slider assembly have a transverse cross-section that is a regular hexagon.

3. The washer-saving valve of claim 1, wherein said slider assembly is in a rotatably connected relationship to said seat-facing end of said helical-threaded valve stem.

4. The washer-saving valve of claim 3, wherein:
   said seat-facing end of said valve stem has a bore therein;
   said slider assembly has a valve-stem facing end wherein:
      said valve-stem facing end has a groove therearound;
      said valve-stem end fits slidably in said bore, and
      walls of said bore are swaged into said groove so as to permit free rotation of said non-circular slider assembly within said bore.

5. The washer-saving valve of claim 3, additionally comprising:
   a seat-washer attachment collar with a central bore therethrough, and wherein:
   said valve stem seat-facing end has a threaded extension;
   said seat-washer attachment collar has a thread complementary to said threaded extension;
   said slider assembly has a valve-stem facing end with a threaded bore therein;
      said seat-washer attachment collar is rotatably attached to said slider assembly by a screw engaged in said threaded bore; and
      said seat-washer attachment collar is attached to said valve stem seat-facing end by engagement of said complementary thread with said threaded extension.

6. The washer saver valve of claim 1, wherein said seat is replaceable.

7. A method of assembling a washer-saving valve comprising:
   providing a valve body having an inner surface and a seat;
   providing in said inner surface of said valve body a helical groove, and
   providing concentrically with and broached through said helical groove a non-circular bore in said inner surface of said valve body;
   providing a valve stem with a helical ridge complementary to said helical groove, said valve stem having a seat-facing end;
   providing a slider assembly having a first and second end so that at least a portion of said slider assembly has a cross-section complementary to said broached non-circular bore and so that a seat-washer may be removably attached to said second end;
   rotatably attaching said first end of said slider assembly to said seat facing end of said valve stem;
   attaching a seat-washer to said second end of said slider assembly;
   whereby:
      said non-circular slider assembly has a seat-washer thereon and fits slidably but non-rotatably within the broached non-circular bore and is in a driven relationship to the seat-facing end of the valve stem, so that when the valve stem is advanced by rotation through the valve body, the slider assembly is prevented from rotating by the non-circular bore so that the seat-washer borne upon the slider assembly does not rotate against the seat upon contact therewith.

\* \* \* \* \*